US009115684B2

(12) United States Patent
Hattar et al.

(10) Patent No.: US 9,115,684 B2
(45) Date of Patent: Aug. 25, 2015

(54) ENGINE STARTUP CONTROL SYSTEMS AND METHODS

(71) Applicant: GM Global Technology Operations LLC, Detroit, MI (US)

(72) Inventors: Rafat F. Hattar, Royal Oak, MI (US); J. Michael Gwidt, Brighton, MI (US); Bradford W. Bur, Clarkston, MI (US)

( * ) Notice: Subject to any disclaimer, the term of this patent is extended or adjusted under 35 U.S.C. 154(b) by 14 days.

(21) Appl. No.: 13/893,758

(22) Filed: May 14, 2013

(65) Prior Publication Data

US 2014/0343812 A1 Nov. 20, 2014

(51) Int. Cl.

| | |
|---|---|
| ***B60W 10/04*** | (2006.01) |
| ***B60W 10/06*** | (2006.01) |
| ***B60W 10/08*** | (2006.01) |
| ***F02N 11/10*** | (2006.01) |

(52) U.S. Cl.
CPC .................................... *F02N 11/103* (2013.01)

(58) Field of Classification Search
CPC ..... B60W 10/04; B60W 10/06; B60W 10/08; B60W 30/18018; F02N 11/0822; F02N 11/0848; F02N 11/0851; F02N 11/103; F02N 11/106; F02N 2200/103
See application file for complete search history.

(56) References Cited

U.S. PATENT DOCUMENTS

| | | | | |
|---|---|---|---|---|
| 6,612,386 B2 * | 9/2003 | Tamai et al. | ............... | 180/65.25 |
| 2002/0179348 A1 * | 12/2002 | Tamai et al. | ................. | 180/65.2 |
| 2006/0243257 A1 * | 11/2006 | Freund et al. | ................. | 123/550 |
| 2010/0298094 A1 * | 11/2010 | Oda et al. | ....................... | 477/179 |

* cited by examiner

*Primary Examiner* — Edwin A Young

(57) ABSTRACT

An engine control system of a vehicle includes a starter control module and an abort module. When a clutch pedal is depressed and a user activates an ignition system, the starter control module engages a starter motor with an engine and applies current to the starter motor. The abort module selectively generates an abort signal when the clutch pedal is released. The starter control module disengages the starter motor and disables current flow to the starter motor when the abort signal is generated.

20 Claims, 4 Drawing Sheets

ENGINE STARTUP CONTROL SYSTEMS AND METHODS

FIELD

The present application relates to internal combustion engines and more particularly to engine control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts an air/fuel mixture to generate drive torque for a vehicle. The air is drawn into the engine through a throttle valve and an intake manifold. The fuel is provided by one or more fuel injectors. The air/fuel mixture is combusted within one or more cylinders of the engine. Combustion of the air/fuel mixture may be initiated by, for example, injection of the fuel and/or spark provided by a spark plug. Combustion of the air/fuel mixture produces exhaust gas. The exhaust gas is expelled from the cylinders to an exhaust system.

An engine control module (ECM) controls the torque output of the engine. For example only, the ECM controls the torque output of the engine based on driver inputs and/or other inputs. The driver inputs may include, for example, an accelerator pedal position, a brake pedal position, inputs to a cruise control system, and/or other driver inputs. The other inputs may include inputs from various vehicle systems, such as a transmission control system.

SUMMARY

In a feature, an engine control system of a vehicle includes a starter control module and an abort module. When a clutch pedal is depressed and a user activates an ignition system, the starter control module engages a starter motor with an engine and applies current to the starter motor. The abort module selectively generates an abort signal when the clutch pedal is released. The starter control module disengages the starter motor and disables current flow to the starter motor when the abort signal is generated.

In further features, the abort module selectively generates the abort signal when the clutch pedal is released and the starter motor is engaged with the engine.

In still further features, the abort module selectively generates the abort signal when the clutch pedal is released and an engine speed is less than a predetermined speed.

In yet further features, a mode determination module that selectively sets an engine mode to a running mode when the engine speed is greater than a second predetermined speed and that sets the engine mode to a cranking mode when the engine speed is less than the second predetermined speed. The abort module selectively generates the abort signal when the clutch is released, the engine speed is less than the predetermined speed, and the engine mode is set to the cranking mode.

In further features, the mode determination module sets the engine mode to the running mode when the engine speed is greater than the second predetermined speed for a predetermined period.

In still further features, the abort module selectively generates the abort signal when the clutch is released, the engine speed is less than the predetermined speed, the engine mode is set to the cranking mode, and the starter motor is engaged with the engine.

In yet further features, the second predetermined speed is one of greater than the predetermined speed and equal to the predetermined speed.

In further features, a fuel control module that disables fueling of the engine when the abort signal is generated.

In still further features, the starter control module engages the starter motor with the engine and applies current to the starter motor when a clutch pedal position measured using a clutch pedal position sensor is greater than a first predetermined value and the user activates the ignition system. The abort module selectively generates the abort signal when the clutch pedal position is less than a second predetermined value, and the second predetermined value is less than the first predetermined value.

In yet further features, a display control module, when the abort signal is generated, generates an indicator on a display that startup of the engine was aborted due to the release of the clutch pedal.

In a feature, an engine control method of a vehicle, includes, when a clutch pedal is depressed and a user activates an ignition system: engaging a starter motor with an engine; and applying current to the starter motor. The engine control method further includes: selectively generating an abort signal when the clutch pedal is released; and, when the abort signal is generated: disengaging the starter motor; and disabling current flow to the starter motor.

In further features, the engine control method further includes selectively generating the abort signal when the clutch pedal is released and the starter motor is engaged with the engine.

In still further features, the engine control method further includes selectively generating the abort signal when the clutch pedal is released and an engine speed is less than a predetermined speed.

In yet further features, the engine control method further includes: selectively setting an engine mode to a running mode when the engine speed is greater than a second predetermined speed; setting the engine mode to a cranking mode when the engine speed is less than the second predetermined speed; and selectively generating the abort signal when the clutch is released, the engine speed is less than the predetermined speed, and the engine mode is set to the cranking mode.

In further features, the engine control method further includes setting the engine mode to the running mode when the engine speed is greater than the second predetermined speed for a predetermined period.

In still further features, the engine control method further includes selectively generating the abort signal when the clutch is released, the engine speed is less than the predetermined speed, the engine mode is set to the cranking mode, and the starter motor is engaged with the engine.

In yet further features, the second predetermined speed is one of greater than the predetermined speed and equal to the predetermined speed.

In further features, the engine control method further includes disabling fueling of the engine when the abort signal is generated.

In still further features, the engine control method further includes: when a clutch pedal position measured using a clutch pedal position sensor is greater than a first predetermined value and the user activates the ignition system: engaging the starter motor with the engine; and applying current to the starter motor; and selectively generating the abort signal when the clutch pedal position is less than a second predetermined value, wherein the second predetermined value is less than the first predetermined value.

In yet further features, the engine control method further includes, when the abort signal is generated, generating an indicator on a display that startup of the engine was aborted due to the release of the clutch pedal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine outputs torque to a manual transmission via a crankshaft. A clutch couples and decouples the engine and the transmission. A driver actuates a clutch pedal to actuate the clutch. For example, the driver depresses the clutch pedal to decouple the engine from the transmission and releases the clutch pedal to couple the engine and the transmission.

An engine control module (ECM) initiates engine cranking when a driver depresses the clutch pedal and inputs a command to start the engine. More specifically, the ECM engages a starter motor and supplies current to the starter motor to start the engine. However, engine speed fluctuations may occur when the driver releases the clutch pedal during engine cranking. The engine speed fluctuations may cause observable vibration within a passenger cabin of the vehicle.

Additionally or alternatively, the engine speed fluctuations may cause one or more other conditions to occur. For example, the engine speed fluctuations may damage one or more engine and/or transmission components, such as a dual mass flywheel. The engine speed fluctuations may additionally or alternatively cause a clutch adjustment mechanism to adjust the clutch away the flywheel unnecessarily. This adjustment of the clutch may render a driver unable to completely decouple the transmission from the engine, even when the clutch pedal is fully depressed.

The ECM of the present disclosure therefore selectively disengages the starter motor, disables current flow to the starter motor, and disables fueling when the clutch pedal is released during engine cranking. One or more other actions may also be taken when the clutch pedal is released during engine cranking. For example, a message may be displayed on a display indicating that engine startup was aborted due to the release of the clutch pedal.

Figure 1:
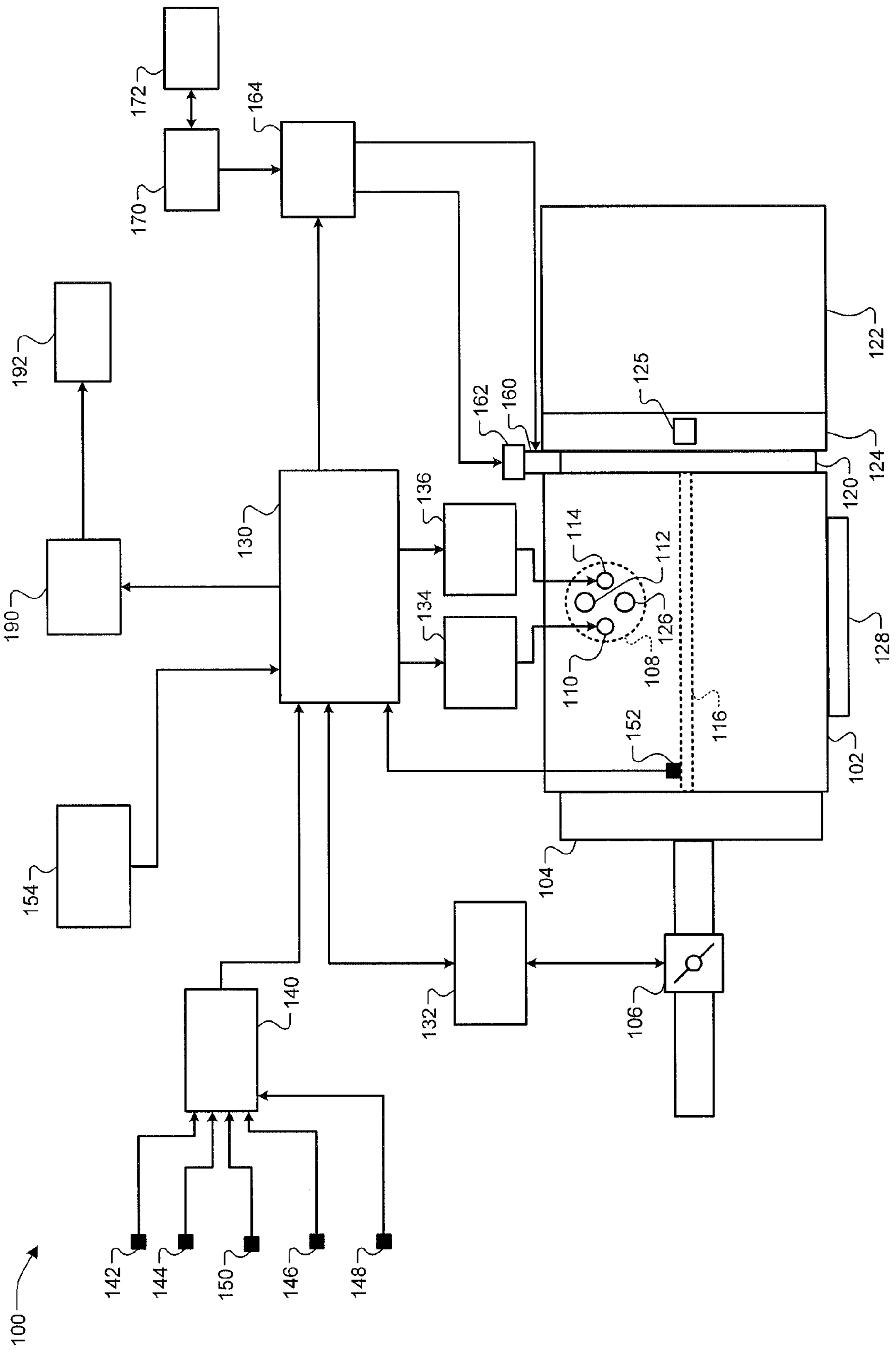
FIG. 1 is a functional block diagram of an example engine system according to the present disclosure.

Referring now to FIG. 1, a functional block diagram of an example engine system 100 is presented. The engine system 100 includes an engine 102 that combusts an air/fuel mixture to produce drive torque for a vehicle. Air is drawn into an intake manifold 104 through a throttle valve 106. The throttle valve 106 regulates air flow into the intake manifold 104. Air within the intake manifold 104 is drawn into one or more cylinders of the engine 102, such as cylinder 108.

One or more fuel injectors, such as fuel injector 110, inject fuel that mixes with air to form an air/fuel mixture. In various implementations, one fuel injector may be provided for each cylinder of the engine 102. One or more intake valves, such as intake valve 112, open to allow air into the cylinder 108. A piston (not shown) compresses the air/fuel mixture within the cylinder 108. In some engine systems, a spark plug 114 initiates combustion of the air/fuel mixture within the cylinder 108. In other engine systems, such as diesel engine systems, combustion may be initiated without the spark plug 114.

Combustion of the air/fuel mixture applies force to the piston, and the piston rotatably drives a crankshaft 116. The engine 102 outputs torque via the crankshaft 116. A flywheel 120, such as a dual mass flywheel (DMF), is coupled to and rotates with the crankshaft 116.

Torque output by the engine 102 is selectively transferred to a manual transmission 122 via a clutch 124. The clutch 124 actuates based on actuation of a clutch pedal (not shown) to engage and disengage the flywheel 120. For example, a driver depresses the clutch pedal to decouple the engine 102 and the transmission 122, and the driver releases the clutch pedal to couple the engine 102 and the transmission 122. The clutch 124 transfers torque to a transmission input shaft, and torque is transferred from the transmission input shaft to a transmission output shaft via a selected gearset. Torque is transferred to one or more wheels of the vehicle via the transmission output shaft.

An adjustment mechanism 125 may automatically adjust the clutch 124 away the flywheel 120 as the clutch 124 wears. The adjustment mechanism 125 may, for example, ratchet in predetermined increments as the clutch 124 wears to adjust the clutch 124 away the flywheel 120. The adjustment of the clutch 124 away the flywheel 120 may ensure that actuation of the clutch 124 remains approximately constant as the clutch 124 wears.

Exhaust produced by combustion of the air/fuel mixture is expelled from the cylinder 108 via an exhaust valve 126. The exhaust is expelled from the cylinders to an exhaust system 128. The exhaust system 128 may treat the exhaust before the exhaust is expelled from the exhaust system 128. Although one intake and exhaust valve are shown and described as being associated with the cylinder 108, more than one intake and/or exhaust valve may be associated with each cylinder of the engine 102.

An engine control module (ECM) 130 controls the torque output of the engine 102 based on one or more driver inputs and/or one or more other parameters. A throttle actuator module 132 controls the throttle valve 106 based on signals from the ECM 130. A fuel actuator module 134 controls the fuel injectors based on signals from the ECM 130. A spark actuator module 136 may control spark plugs based on signals from the ECM 130. A driver input module 140 may provide the driver inputs to the ECM 130. The driver inputs may include, for example, an accelerator pedal position (APP), a brake pedal position (BPP), a clutch pedal position (CPP), cruise control inputs, and ignition system commands.

An APP sensor 142 measures a position of an accelerator pedal (not shown) and generates an APP signal based on the position of the accelerator pedal. A BPP sensor 144 measures a position of a brake pedal (not shown) and generates a BPP signal based on the position of the brake pedal. A CPP sensor

150 measures a position of the clutch pedal and generates a CPP signal based on the position of the clutch pedal. While the APP sensor 142, the BPP sensor 144, and the CPP sensor 150 are shown and described, one or more additional APP, BPP, and/or CPP sensors may be implemented.

A cruise control system 146 generates the cruise control inputs, such as a desired vehicle speed, based on inputs to the cruise control system 146. The ignition system commands may include, for example, vehicle startup commands and vehicle shutdown commands. The ignition system commands may be generated based on actuation of, for example, an ignition key, one or more ignition buttons/switches, and/or one or more suitable ignition system inputs 148.

A crankshaft position sensor 152 monitors rotation of the crankshaft 116 and generates a crankshaft position signal based on the rotation of the crankshaft 116. For example only, the crankshaft position sensor 152 may include a variable reluctance (VR) sensor, a Hall effect sensor, or another suitable type of crankshaft position sensor. The crankshaft position sensor 152 may generate the crankshaft position signal based on rotation of the flywheel 120 or another suitable N-toothed wheel, where N represents the number of teeth.

The ECM 130 may determine an engine speed based on crankshaft position. The ECM 130 may receive parameters measured using other sensors 154, such as oxygen in the exhaust, engine coolant temperature, intake air temperature, mass air flowrate, oil temperature, manifold absolute pressure, and/or other suitable operating parameters.

The ECM 130 selectively shuts down the engine 102 when a vehicle shutdown command is received. For example only, the ECM 130 may disable the injection of fuel and perform other engine shutdown operations to shut down the engine 102.

A starter motor actuator 162, such as a solenoid, engages a starter motor 160 with the engine 102 when a vehicle startup command is received and the clutch pedal is depressed. The starter motor 160 may engage the flywheel 120 or one or more other suitable components that drive rotation of the crankshaft 116. A starter actuator module 164 controls the starter motor actuator 162 and the starter motor 160 based on signals from the ECM 130.

The starter actuator module 164 selectively applies current to the starter motor 160 when the starter motor 160 is engaged with the engine 102. The application of current to the starter motor 160 drives rotation of the starter motor 160, and the starter motor 160 drives rotation of the crankshaft 116 (e.g., via the flywheel 120) to start the engine 102. The period that the starter motor 160 drives the crankshaft 116 before the engine 102 is deemed running may be referred to as engine cranking.

Current may be provided to the starter motor 160 by, for example, one or more batteries, such as battery 170. The engine system 100 may include one or more electric motors, such as electric motor (EM) 172. The EM 172 may selectively draw electrical power from the battery 170, for example, to supplement the torque output of the engine 102. The EM 172 may also selectively function as a generator and selectively apply a braking torque to generate electrical power. Electrical power generated by an EM may be used, for example, to charge the battery 170, to power one or more other EMs (not shown), to power one or more other vehicle systems, and/or other for other suitable purposes.

Once the engine 102 is deemed running, the starter motor 160 may disengage the engine 102, and current flow to the starter motor 160 may be disabled. The engine 102 may be deemed running and engine cranking may end, for example, when the engine speed is greater than a predetermined speed for a predetermined number of combustion events.

Release of the clutch pedal during engine cranking may cause fluctuations in the engine speed. The engine speed fluctuations may cause observable vibration within a passenger cabin of the vehicle. The vibration may be perceived by a user as improper engine operation. The engine speed fluctuations may cause one or more other conditions to occur. For example, the engine speed fluctuations may damage one or more engine and/or transmission components, such as the flywheel 120.

The engine speed fluctuations may additionally or alternatively cause the adjustment mechanism 125 to adjust the clutch 124 away the flywheel 120 unnecessarily. Other types of adjustment mechanisms may adjust a clutch toward a flywheel as the clutch wears. This adjustment of the clutch 124 may render a driver unable to completely decouple the transmission 122 from the engine 102, even when the clutch pedal is fully depressed. The inability to completely decouple the transmission 122 from the engine 102 may render the engine 102 unable to start due to the torque load imposed on the engine 102 via the clutch 124. Even if the engine 102 is able to start, however, a driver may be unable to shift the transmission 122 into gear due to the inability to completely decouple the transmission 122 from the engine 102.

The ECM 130 of the present disclosure therefore selectively aborts engine startup when the clutch pedal is released during engine cranking. More specifically, the ECM 130 disengages the starter motor 160, disables current flow to the starter motor 160, and disables fueling when the clutch pedal is released during engine cranking. One or more other actions may also be taken when the clutch pedal is released during engine cranking. For example, a display control module 190 may generate a message on a display 192 indicating that startup of the engine 102 was aborted due to the release of the clutch pedal.

Figure 2:
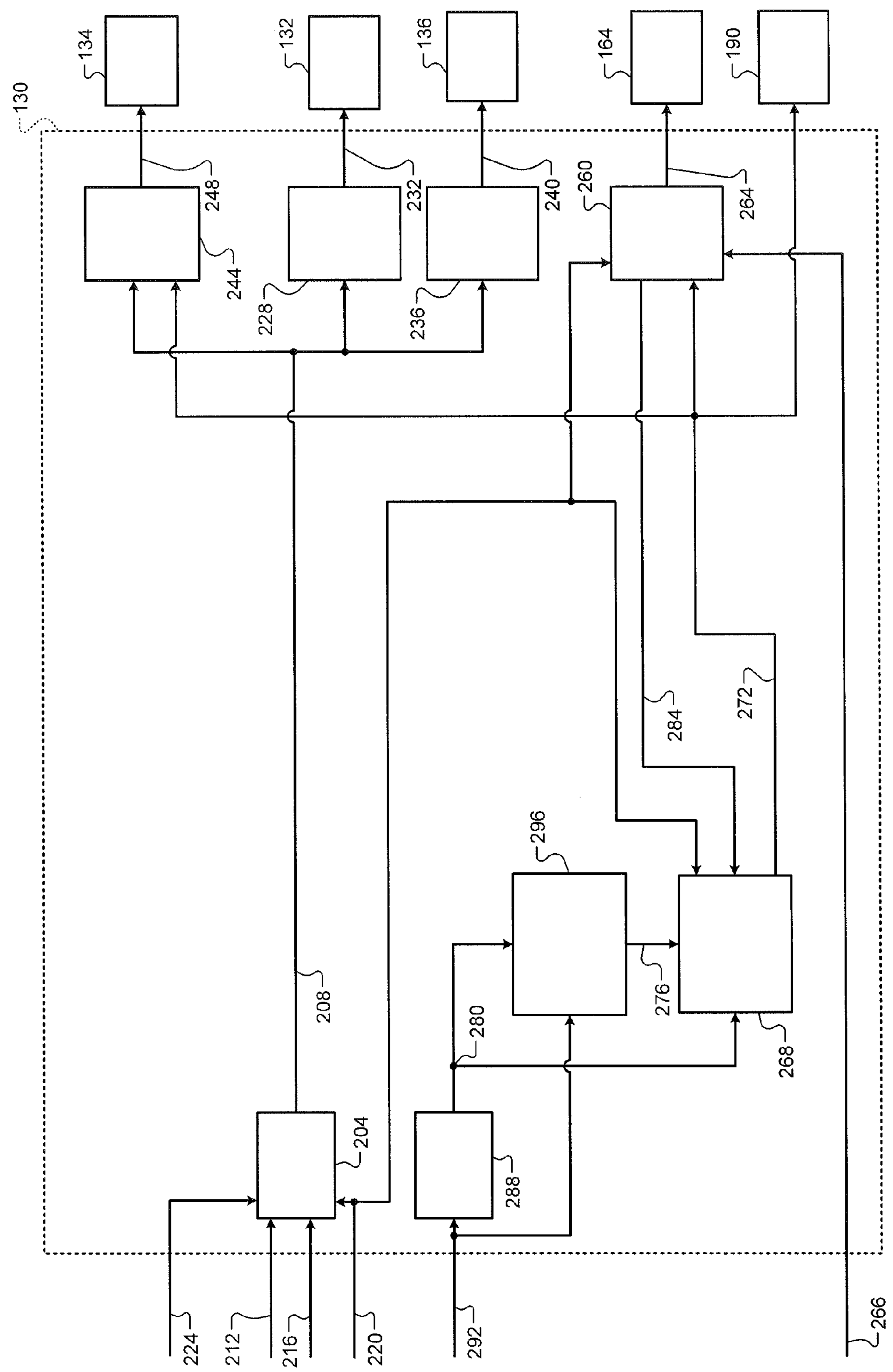
FIG. 2 is a functional block diagram of an engine control system according to the present disclosure.

Referring now to FIG. 2, a functional block diagram of an example engine control system is presented. A torque request module 204 may determine a torque request 208 based on one or more driver inputs, such as an APP 212, a BPP 216, a CPP 220, a cruise control input 224, and/or one or more other suitable driver inputs. The APP 212, the BPP 216, and the CPP 220 may be measured using the APP sensor 142, the BPP sensor 144, and the CPP sensor 150, respectively.

The torque request module 204 may determine the torque request 208 additionally or alternatively based on one or more other torque requests. For example, the torque request module 204 may determine the torque request 208 additionally or alternatively based on torque requests generated by the ECM 130 and/or torque requests received from other modules of the vehicle, such as a transmission control module, a hybrid control module, a chassis control module, etc.

One or more engine actuators may be controlled based on the torque request 208 and/or one or more other parameters. For example, a throttle control module 228 may determine a target throttle opening 232 based on the torque request 208. The throttle actuator module 132 may adjust opening of the throttle valve 106 based on the target throttle opening 232.

A spark control module 236 may determine a target spark timing 240 based on the torque request 208. The spark actuator module 136 may generate spark based on the target spark timing 240. A fuel control module 244 may determine one or more target fueling parameters 248 based on the torque request 208. For example, the target fueling parameters 248 may include fuel injection amount, number of fuel injections for injecting the amount, and timing for each of the injections.

The fuel actuator module 134 may inject fuel based on the target fueling parameters 248. One or more other engine actuators may be controlled based on the torque request 208 and/or one or more other parameters.

A starter control module 260 generates starter commands 264, and the starter actuator module 164 controls the starter motor actuator 162 and current flow to the starter motor 160 based on the starter commands 264. When a vehicle startup command 266 is received and the CPP 220 is greater than a first predetermined value, the starter control module 260 generates the starter commands 264 to engage the starter motor 160 with the engine 102 and to apply current to the starter motor 160. The starter motor 160 then drives rotation of the crankshaft 116 to start the engine 102. Fuel is supplied to the engine 102 for combustion while the starter motor 160 drives the crankshaft 116. The CPP 220 being greater than the first predetermined value indicates that the clutch pedal is depressed to at least a predetermined position such that the engine 102 and the transmission 122 should be decoupled.

An abort module 268 selectively generates an abort signal 272 when the CPP 220 is less than a second predetermined value during engine cranking. For example, the abort module 268 may set the abort signal 272 to a predetermined state or value indicating that the clutch pedal is released during engine cranking. The second predetermined value is less than the first predetermined value.

The CPP 220 being less than the second predetermined value during engine cranking indicates that the clutch pedal has been at least partially released. For example only, where a value of 100 percent (%) indicates that the clutch pedal is fully depressed and a value of 0 percent indicates that the clutch pedal is in a resting position, the second predetermined value may be approximately 75 percent (i.e., 25 percent released) or another suitable value. As described above, engine speed fluctuations may occur when the clutch pedal is released during engine cranking.

When the abort signal 272 is generated, the starter control module 260 generates the starter commands 264 to disengage the starter motor 160 from the engine 102 and to disable current flow to the starter motor 160. The fuel control module 244 disables fueling of the engine 102 when the abort signal 272 is generated. The disengagement and disablement of the starter motor 160 and the stoppage of fueling allows the crankshaft 116 to slow and eventually stop.

One or more other actions may be taken when the abort signal 272 is generated. For example, the display control module 190 may generate a message on the display 192 indicating that startup of the engine 102 was aborted due to the release of the clutch pedal when the abort signal 272 is generated.

For purposes of generating the abort signal 272, the abort module 268 may verify that engine cranking is occurring based on one or more parameters. For example only, the abort module 268 may generate the abort signal 272 when an engine mode 276 is set to a cranking mode, an engine speed 280 is less than a first predetermined speed, and/or a starter status 284 indicates that the starter motor 160 is engaged with the engine 102 and receiving current.

Accordingly, the abort module 268 may generate the abort signal 272 when the CPP 220 is less than the second predetermined value and at least one of the engine mode 276 is set to the cranking mode, the engine speed 280 is less than the first predetermined speed, and the starter status 284 indicates that the starter motor 160 is engaged with the engine 102 and receiving current. Conversely, the abort module 268 may not generate the abort signal 272 when the CPP is greater than the second predetermined value and/or the engine mode 276 is not set to the cranking mode, the engine speed 280 is greater than the first predetermined speed, and the starter status 284 indicates that the starter motor 160 is disengaged from the engine 102 and not receiving current. Engine startup may continue as normal when the abort signal 272 is not generated during engine cranking.

The starter control module 260 may set the starter status 284 based on the starter commands 264. An engine speed module 288 may determine the engine speed 280 based on a crankshaft position 292 measured using the crankshaft position sensor 152. A mode determination module 296 may determine the engine mode 276, for example, based on the engine speed 280 and one or more other parameters, such as the crankshaft position 292.

For example, the mode determination module 296 sets the engine mode 276 to the cranking mode when the engine speed 280 is less than a second predetermined speed. The second predetermined speed may be greater than or equal to the first predetermined speed. The first predetermined speed may be, for example, approximately 600 revolutions per minute (rpm) or another suitable speed. The mode determination module 296 may set the engine mode 276 to a running mode when the engine speed 280 is greater than the second predetermined speed for a predetermined period and/or for a predetermined number of events (e.g., a predetermined number of combustion events or engine cycles).

Figure 3:
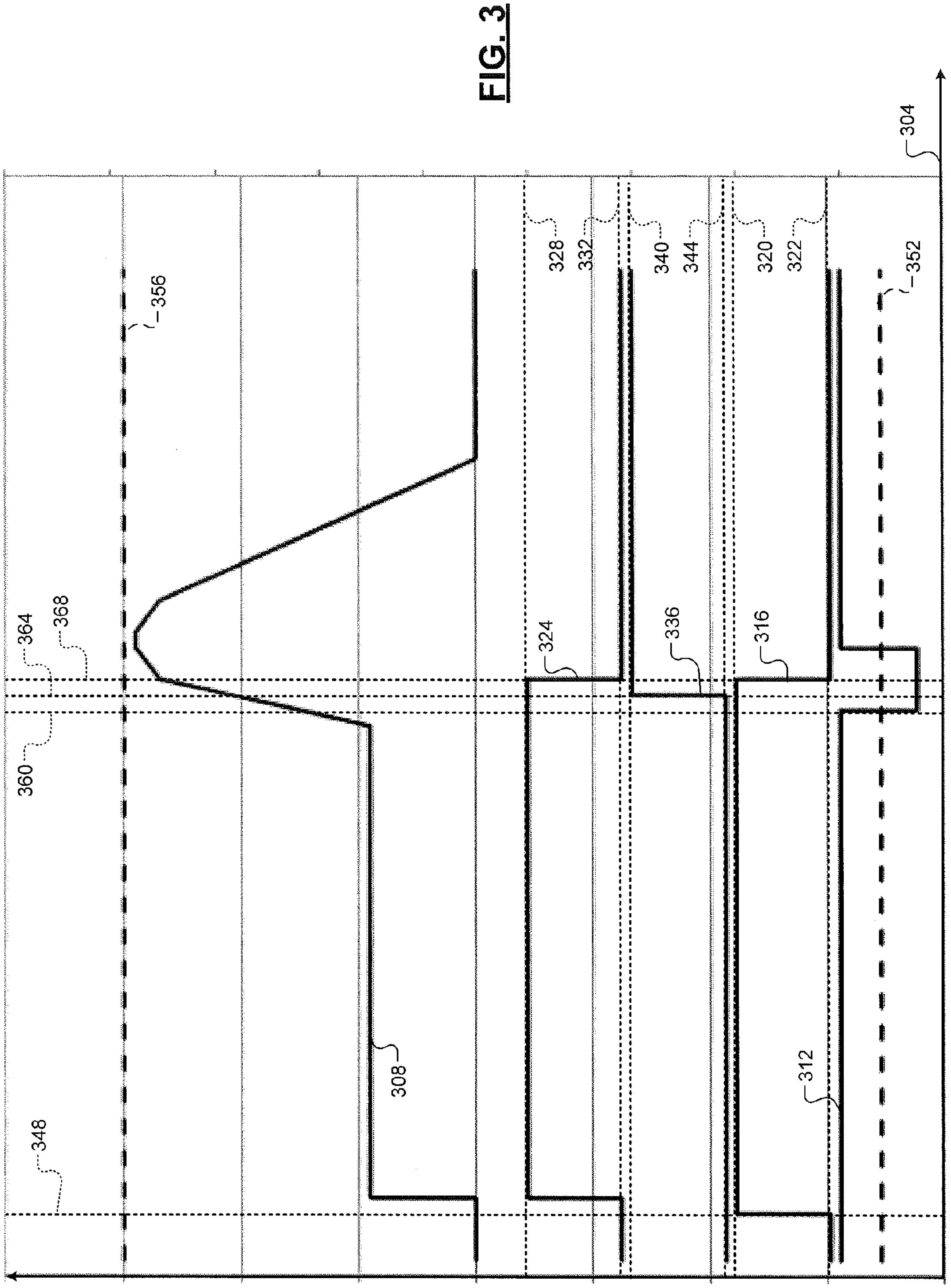
FIG. 3 is an example graph of engine speed and clutch pedal position during an engine startup event.

Referring now to FIG. 3, an example graph of engine speed and CPP versus time 304 for an engine startup event is presented. Waveform 308 tracks the engine speed 280. Waveform 312 tracks the CPP 220. Waveform 316 indicates whether the starter motor 160 is engaged and receiving current. For example, waveform 316 may be in a first state 320 when the starter motor 160 is engaged and receiving current, and waveform 316 may be in a second state 322 when the starter motor 160 is disengaged and current flow to the starter motor 160 is disabled. Waveform 324 tracks whether fueling is being performed. For example, waveform 324 may be in a first state 328 when fueling is being performed, and waveform 324 may be in a second state 332 when fueling is disabled. Waveform 336 tracks generation of the abort signal 272. For example, waveform 336 may be in a first state 340 when the abort signal 272 is generated, and waveform 336 may be in a second state 344 when the abort signal 272 is not generated.

The starter motor 160 is engaged with the engine 102 and current is applied to the starter motor 160 at time 348 to begin engine cranking, as indicated by waveform 316 transitioning to the first state 320. The engine speed 280 therefore increases as indicated by waveform 308 and fueling is enabled as indicated by waveform 324 transitioning to the first state 328.

Example line 352 corresponds to the second predetermined value (of the CPP), and example line 356 corresponds to the first predetermined speed (e.g., approximately 600 rpm or another suitable speed). At approximately time 360, the CPP becomes less than the second predetermined value, as indicated by waveform 312 crossing line 352, while the engine speed is less than the first predetermined speed.

The abort module 268 may therefore generate the abort signal 272 at approximately time 364, as indicated by the waveform 336 transitioning to the first state 340. The abort module 268 may also require that one or more other conditions be satisfied before generating the abort signal, as described above. In response to the generation of the abort signal 272, at approximately time 368, the starter motor 160 is disengaged and current flow to the starter motor 160 is disabled, as indicated by waveform 316 transitioning to the second state 322, and fueling is disabled, as indicated by waveform 324 transitioning to the second state 332. This allows the engine speed to slow, as indicated by waveform 308.

Figure 4:
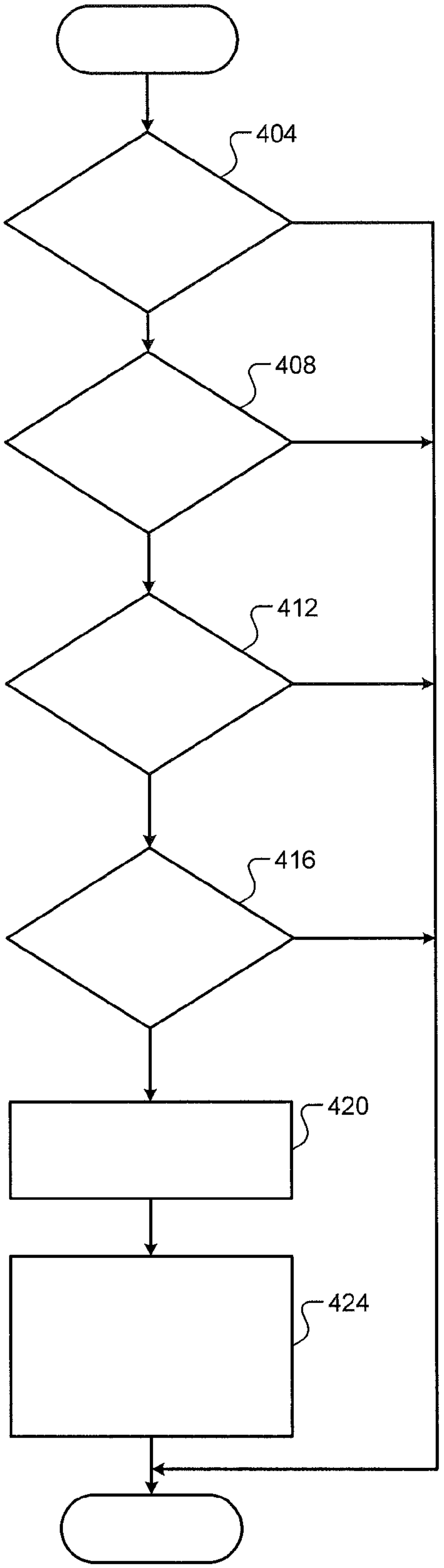
FIG. 4 is a flowchart depicting an example method of controlling startup of an engine according to the present disclosure.

Referring now to FIG. 4, a flowchart depicting an example method of controlling startup of the engine 102 is presented. Control may begin with 404 where the abort module 268 may determine whether the starter motor 160 is engaged and receiving current to drive the crankshaft 116. If 404 is true, control may continue with 408. If 404 is false, control may end. The starter control module 260 may engage the starter motor 160 and apply current to the starter motor 160, for example, when the vehicle startup command 266 is received and the CPP 220 is greater than the first predetermined value.

At 408, the abort module 268 may determine whether the CPP 220 is less than the second predetermined value. If 408 is true, control may continue with 412. If 408 is false, control may end. The second predetermined value is less than the first predetermined value and may be, for example, approximately 75 percent depressed (relative to a resting position) or another suitable value.

The abort module 268 may determine whether the engine speed 280 is less than the first predetermined speed at 412. If 412 is true, control may continue with 416. If 412 is false, control may end. For example only, the first predetermined speed may be approximately 600 rpm or another suitable speed.

The abort module 268 may determine whether the engine mode 276 is set to the cranking mode at 416. If 416 is true, control may continue with 420. If 416 is false, control may end. At 420, the abort module 268 generates the abort signal 272 indicating that the clutch pedal was released during engine cranking. At 424, in response to the generation of the abort signal 272, the starter control module 260 disengages the starter motor 160 and disables current flow to the starter motor 160, and the fuel control module 244 disables fueling of the engine 102 to abort the engine startup. One or more other actions may also be taken at 424. For example, the display control module 190 may generate the message on the display 192 indicating that the engine startup was aborted due to the release of the clutch pedal. While control is shown and discussed as ending, the example of FIG. 4 may be illustrative of one control loop, and control loops may be performed at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An engine control system of a vehicle, comprising:

a starter control module that, when a clutch pedal is depressed and a user activates an ignition system, engages a starter motor with an engine and applies current to the starter motor; and an abort module that selectively generates an abort signal when the clutch pedal is released, wherein the starter control module disengages the starter motor and disables current flow to the starter motor when the abort signal is generated.

2. The engine control system of claim 1 wherein the abort module selectively generates the abort signal when the clutch pedal is released and the starter motor is engaged with the engine.

3. The engine control system of claim 1 wherein the abort module selectively generates the abort signal when the clutch pedal is released and an engine speed is less than a predetermined speed.

4. The engine control system of claim 3 further comprising a mode determination module that selectively sets an engine mode to a running mode when the engine speed is greater than a second predetermined speed and that sets the engine mode to a cranking mode when the engine speed is less than the second predetermined speed, wherein the abort module selectively generates the abort signal when the clutch is released, the engine speed is less than the predetermined speed, and the engine mode is set to the cranking mode.

5. The engine control system of claim 4 wherein the mode determination module sets the engine mode to the running mode when the engine speed is greater than the second predetermined speed for a predetermined period.

6. The engine control system of claim 4 wherein the abort module selectively generates the abort signal when the clutch is released, the engine speed is less than the predetermined speed, the engine mode is set to the cranking mode, and the starter motor is engaged with the engine.

7. The engine control system of claim 4 wherein the second predetermined speed is one of greater than the predetermined speed and equal to the predetermined speed.

8. The engine control system of claim 1 further comprising a fuel control module that disables fueling of the engine when the abort signal is generated.

9. The engine control system of claim 1 wherein the starter control module engages the starter motor with the engine and applies current to the starter motor when a clutch pedal position measured using a clutch pedal position sensor is greater than a first predetermined value and the user activates the ignition system, wherein the abort module selectively generates the abort signal when the clutch pedal position is less than a second predetermined value, and wherein the second predetermined value is less than the first predetermined value.

10. The engine control system of claim 1 further comprising a display control module that, when the abort signal is generated, generates an indicator on a display that startup of the engine was aborted due to the release of the clutch pedal.

11. An engine control method of a vehicle, comprising:

when a clutch pedal is depressed and a user activates an ignition system:

engaging a starter motor with an engine; and applying current to the starter motor;

selectively generating an abort signal when the clutch pedal is released; and, when the abort signal is generated:

disengaging the starter motor; and disabling current flow to the starter motor.

12. The engine control method of claim 11 further comprising selectively generating the abort signal when the clutch pedal is released and the starter motor is engaged with the engine.

13. The engine control method of claim 11 further comprising selectively generating the abort signal when the clutch pedal is released and an engine speed is less than a predetermined speed.

14. The engine control method of claim 13 further comprising:

selectively setting an engine mode to a running mode when the engine speed is greater than a second predetermined speed;

setting the engine mode to a cranking mode when the engine speed is less than the second predetermined speed; and selectively generating the abort signal when the clutch is released, the engine speed is less than the predetermined speed, and the engine mode is set to the cranking mode.

15. The engine control method of claim 14 further comprising setting the engine mode to the running mode when the engine speed is greater than the second predetermined speed for a predetermined period.

16. The engine control method of claim 14 further comprising selectively generating the abort signal when the clutch is released, the engine speed is less than the predetermined speed, the engine mode is set to the cranking mode, and the starter motor is engaged with the engine.

17. The engine control method of claim 14 wherein the second predetermined speed is one of greater than the predetermined speed and equal to the predetermined speed.

18. The engine control method of claim 11 further comprising disabling fueling of the engine when the abort signal is generated.

19. The engine control method of claim 11 further comprising:

when a clutch pedal position measured using a clutch pedal position sensor is greater than a first predetermined value and the user activates the ignition system:

engaging the starter motor with the engine; and applying current to the starter motor; and selectively generating the abort signal when the clutch pedal position is less than a second predetermined value, wherein the second predetermined value is less than the first predetermined value.

20. The engine control method of claim 11 further comprising, when the abort signal is generated, generating an indicator on a display that startup of the engine was aborted due to the release of the clutch pedal.

* * * * *

UNITED STATES PATENT AND TRADEMARK OFFICE

CERTIFICATE OF CORRECTION

PATENT NO. : 9,115,684 B2
APPLICATION NO. : 13/893758
DATED : August 25, 2015
INVENTOR(S) : Hattar et al.

It is certified that error appears in the above-identified patent and that said Letters Patent is hereby corrected as shown below:

On the Title Page, Item [73], insert
--GM Global Technology Operations LLC, Detroit, MI (US)--

Signed and Sealed this
Twenty-fourth Day of May, 2016

Michelle K. Lee
*Director of the United States Patent and Trademark Office*